US011050127B2

United States Patent
Koike et al.

(10) Patent No.: US 11,050,127 B2
(45) Date of Patent: Jun. 29, 2021

(54) BATTERY AND BATTERY MANUFACTURING METHOD

(71) Applicant: TOYOTA JIDOSHA KABUSHIKI KAISHA, Toyota (JP)

(72) Inventors: Masaki Koike, Nagoya (JP); Yoshinori Shibata, Nagoya (JP); Kousuke Suzuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/276,146

(22) Filed: Feb. 14, 2019

(65) Prior Publication Data
US 2019/0260008 A1    Aug. 22, 2019

(30) Foreign Application Priority Data

Feb. 16, 2018    (JP) .............................. JP2018-025956

(51) Int. Cl.
*H01M 50/54*    (2021.01)
*H01M 10/0525*    (2010.01)
*H01M 10/0585*    (2010.01)

(52) U.S. Cl.
CPC ....... *H01M 50/54* (2021.01); *H01M 10/0525* (2013.01); *H01M 10/0585* (2013.01)

(58) Field of Classification Search
None
See application file for complete search history.

(56) References Cited

U.S. PATENT DOCUMENTS

| 9,219,267 | B2 * | 12/2015 | Woo | H01M 50/531 |
| 2015/0318526 | A1 * | 11/2015 | Mune | H01M 2/305 |
| | | | | 429/56 |

FOREIGN PATENT DOCUMENTS

| JP | 2013-254628 A | 12/2013 |
| JP | 2016-100323 A | 5/2016 |

* cited by examiner

*Primary Examiner* — Carmen V Lyles-Irving
(74) *Attorney, Agent, or Firm* — Sughrue Mion, PLLC (57) ABSTRACT

A battery includes an electrode body and an internal terminal attached to the electrode body. The electrode body includes positive electrode sheets, negative electrode sheets, and separators. The positive electrode sheets and the negative electrode sheets are alternately stacked in a stacking direction, with each separator interposed between associated adjacent ones of the positive electrode sheets and the negative electrode sheets. The positive electrode sheets and the negative electrode sheets each include a collector foil. At least either portions of the collector foils of the positive electrode sheets or the negative electrode sheets are protruded beyond the separators in one direction. The protruded portions of the collector foils are piled in a stack in the stacking direction. The internal terminal includes a connector connected to the stack of the protruded portions of the collector foils. The stack of the protruded portions is bent around a base end of the protruded portions of the collector foils.

2 Claims, 10 Drawing Sheets

BATTERY AND BATTERY MANUFACTURING METHOD

CROSS-REFERENCE TO RELATED APPLICATIONS

This application claims the benefit of priority to Japanese Patent Application No. 2018-025956 filed on Feb. 16, 2018. The entire contents of this application are incorporated herein by reference.

BACKGROUND

The present disclosure relates to batteries and battery manufacturing methods.

JP 2013-254628 A discloses a secondary battery including a "stacked" electrode body and a rectangular battery case. The electrode body includes a plurality of positive electrode sheets, a plurality of negative electrode sheets, and a plurality of separators. The positive electrode sheets and the negative electrode sheets are stacked, with each separator interposed between associated adjacent ones of the positive electrode sheets and the negative electrode sheets. A direction in which the positive electrode sheets and the negative electrode sheets are stacked corresponds to the thickness direction of the electrode body. The electrode body is housed in the battery case. The electrode body is provided with a first collector assembly. The first collector assembly includes collectors of the positive electrode sheets that are put together at a first end of the electrode body in the thickness direction and bent toward a second end of the electrode body in the thickness direction. The first collector assembly is connected with a rectangular plate collector terminal by ultrasonic welding. The electrode body is further provided with a second collector assembly. The second collector assembly includes collectors of the negative electrode sheets that are put together at the first end of the electrode body in the thickness direction and bent toward the second end of the electrode body in the thickness direction. The second collector assembly is connected with another rectangular plate collector terminal by ultrasonic welding.

JP 2016-100323 A discloses a battery including an electrode body and a battery case. Widthwise ends of the electrode body are provided with collectors. The collectors are each connected to an associated terminal attached to a lid of the battery case in a rivet-like manner.

SUMMARY

A battery mounted on a motor vehicle is required to enable the vehicle to travel for a long distance in an EV traveling mode with a single full charge. This makes it necessary to increase the capacity of the battery. Because an installation space for such a vehicle-mounted battery is limited, the battery is required to have a high volume energy density in order to increase the capacity of the battery. To increase the volume energy density, a dead space in a battery case is preferably as small as possible. The inventors of the present disclosure conducted research to find out a compact collector structure for an electrode body with the aim of reducing a dead space in a battery case.

An embodiment of the present disclosure provides a battery including an electrode body and an internal terminal attached to the electrode body. The electrode body includes a plurality of positive electrode sheets, a plurality of negative electrode sheets, and a plurality of separators. The positive electrode sheets and the negative electrode sheets are alternately stacked in a stacking direction, with each separator interposed between associated adjacent ones of the positive electrode sheets and the negative electrode sheets. The positive electrode sheets and the negative electrode sheets each include a collector foil. At least either portions of the collector foils of the positive electrode sheets or portions of the collector foils of the negative electrode sheets are protruded beyond the separators in one direction. The protruded portions of the collector foils are piled in a stack in the stacking direction. The internal terminal includes a connector connected to the stack of the protruded portions of the collector foils. The stack of the protruded portions of the collector foils connected to the connector is bent around a base end of the protruded portions of the collector foils.

This embodiment provides a compact collector structure for the protruded portions of the collector foils of the electrode body. Such a compact collector structure reduces a dead space in a battery case.

The connector of the internal terminal may have a flat plate shape. With the stack of the protruded portions of the collector foils bent around the base end of the protruded portions of the collector foils, the connector connected to the stack of the protruded portions may be located outward of the base end. The internal terminal preferably further includes a case coupling attached to a case component. The case coupling is preferably disposed on an end of the connector such that the case coupling extends along a peripheral edge of the electrode body. This provides a compact collector structure extending along the peripheral edge of the electrode body.

The internal terminal may include a positive electrode internal terminal and a negative electrode internal terminal.

Portions of the collector foils of the positive electrode sheets are preferably protruded beyond first widthwise ends of the separators. The protruded portions of the collector foils of the positive electrode sheets are preferably piled in a stack in the stacking direction. The positive electrode internal terminal preferably includes a positive electrode connector. The positive electrode connector of the positive electrode internal terminal is preferably connected to the stack of the protruded portions of the collector foils of the positive electrode sheets. The stack of the protruded portions of the collector foils of the positive electrode sheets connected to the positive electrode connector is preferably bent around a base end of the protruded portions of the collector foils of the positive electrode sheets.

Portions of the collector foils of the negative electrode sheets are preferably protruded beyond second widthwise ends of the separators. The protruded portions of the collector foils of the negative electrode sheets are preferably piled in a stack in the stacking direction. The negative electrode internal terminal preferably includes a negative electrode connector. The negative electrode connector of the negative electrode internal terminal is preferably connected to the stack of the protruded portions of the collector foils of the negative electrode sheets. The stack of the protruded portions of the collector foils of the negative electrode sheets connected to the negative electrode connector is preferably bent around a base end of the protruded portions of the collector foils of the negative electrode sheets.

This provides a compact positive electrode collector structure for the portions of the collector foils protruded from the first widthwise ends of the separators, and a compact negative electrode collector structure for the portions of the collector foils protruded from the second widthwise ends of the separators.

Another embodiment of the present disclosure provides a battery manufacturing method including the steps of: a) preparing an electrode body; b) preparing an internal terminal; and c) attaching the internal terminal to the electrode body.

The electrode body prepared in step a) includes a plurality of positive electrode sheets, a plurality of negative electrode sheets, and a plurality of separators. The positive electrode sheets and the negative electrode sheets are alternately stacked in a stacking direction, with each separator interposed between associated adjacent ones of the positive electrode sheets and the negative electrode sheets. The positive electrode sheets and the negative electrode sheets each include a collector foil. At least either portions of the collector foils of the positive electrode sheets or portions of the collector foils of the negative electrode sheets are protruded beyond the separators in one direction.

The internal terminal prepared in step b) includes a connector to be attached to the collector foils.

Step c) includes the sub-steps of: c1) piling the protruded portions of the collector foils in a stack in the stacking direction; c2) connecting the connector of the internal terminal to the stack of the protruded portions of the collector foils; and c3) bending the stack of the protruded portions of the collector foils connected to the connector. The stack of the protruded portions is bent around a base end of the protruded portions of the collector foils.

This embodiment provides a battery having a compact collector structure.

The stacking direction may include a first direction and a second direction opposite to the first direction. Sub-step c1) may involve bringing a first plate and a second plate into contact with the protruded portions of the collector foils in the first direction and the second direction, respectively, such that the protruded portions of the collector foils are brought to an intermediate location in the stacking direction so as to pile the protruded portions of the collector foils in a stack.

During or before the bending of the stack of the protruded portions of the collector foils connected to the connector, sub-step c3) may involve removing one of the first and second plates that is located opposite to a direction in which the stack of the protruded portions is to be bent.

The battery manufacturing method may further include the steps of: d) preparing a case component; e) preparing an external terminal; and f) attaching the internal terminal to the case component, with the internal terminal attached to the electrode body in step c).

The case component prepared in step d) preferably includes an attachment hole through which the internal terminal is to be attached to the case component. The internal terminal prepared in step b) preferably includes a shaft to be inserted through the attachment hole. The shaft is preferably disposed on a portion of the internal terminal extending from the connector. The external terminal prepared in step e) preferably includes a connector to be connected with an end of the shaft inserted through the attachment hole. Step f) preferably involves: inserting the shaft of the internal terminal through the attachment hole of the case component, with an insulator disposed in the attachment hole; and connecting the connector of the external terminal to the shaft of the internal terminal inserted through the attachment hole.

The internal terminal may thus be attached to the case component after the internal terminal is attached to the electrode body.

BRIEF DESCRIPTION OF THE DRAWINGS

FIG. 8 is a plan view of the electrode body 11, illustrating sub-step c3) involving bending the stack of the protruded portions of the collector foils 11a1 connected to a connector 12a.

DETAILED DESCRIPTION

Batteries and battery manufacturing methods according to embodiments of the present disclosure will be described below. The embodiments described below are naturally not intended to limit the present invention in any way. Unless otherwise specified, the present invention is not limited to the embodiments described below. Each of the accompanying drawings is a schematic illustration and thus does not necessarily depict actual shapes or sizes. Components or elements having the same functions may be identified by the same reference signs, and description thereof will be omitted when deemed redundant. The reference signs may be omitted in detailed illustrations. The reference signs U, D, R, L, F, and Rr in the drawings respectively represent up, down, right, left, front, and rear. These directions are defined merely for the sake of convenience and are not intended to limit in any way how a battery 10 may be installed.

Figure 1:
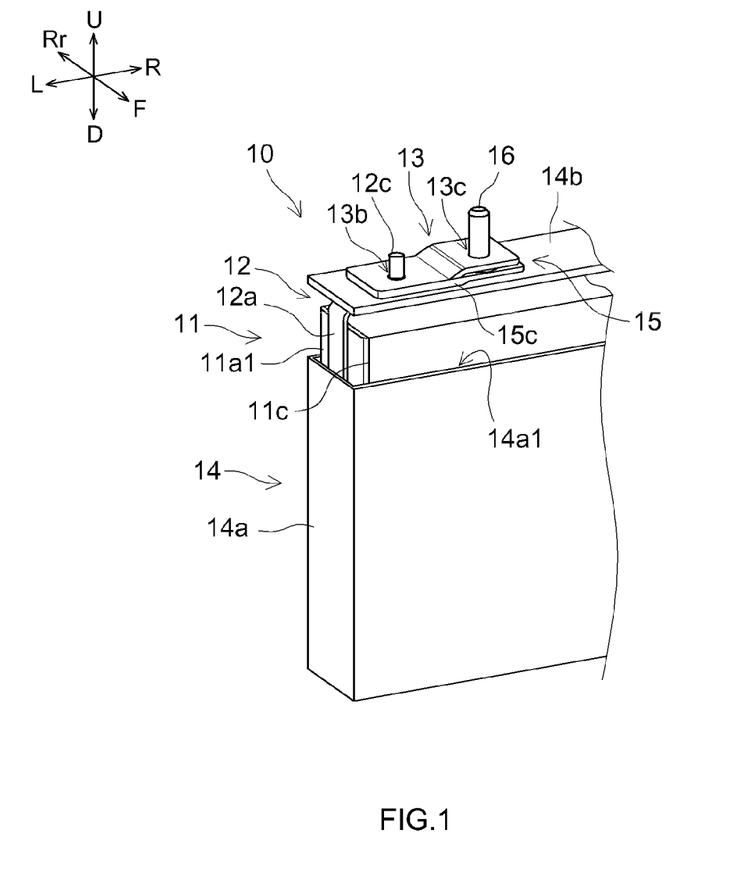
FIG. 1 is a partial perspective view of a battery 10, with an electrode body 11 and an internal terminal 12 attached to a lid 14b of a battery case 14.
Figure 2:
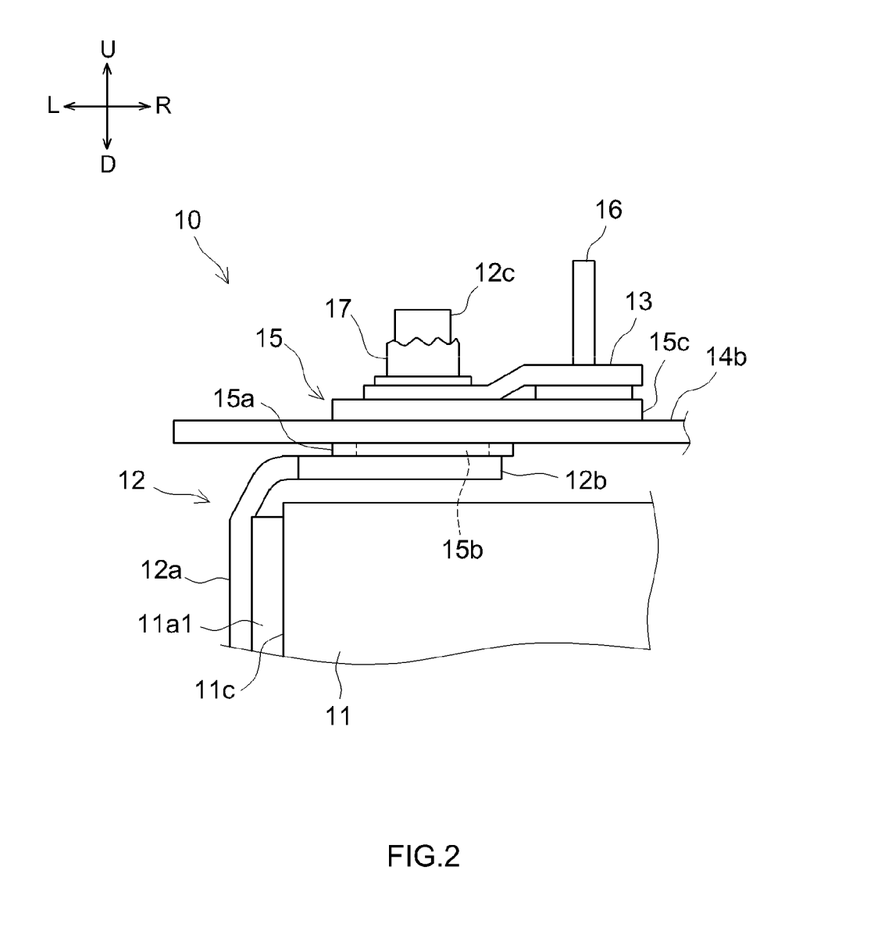
FIG. 2 is a partial side view of the battery 10, with the internal terminal 12 attached to the lid 14b of the battery case 14.
Figure 3:
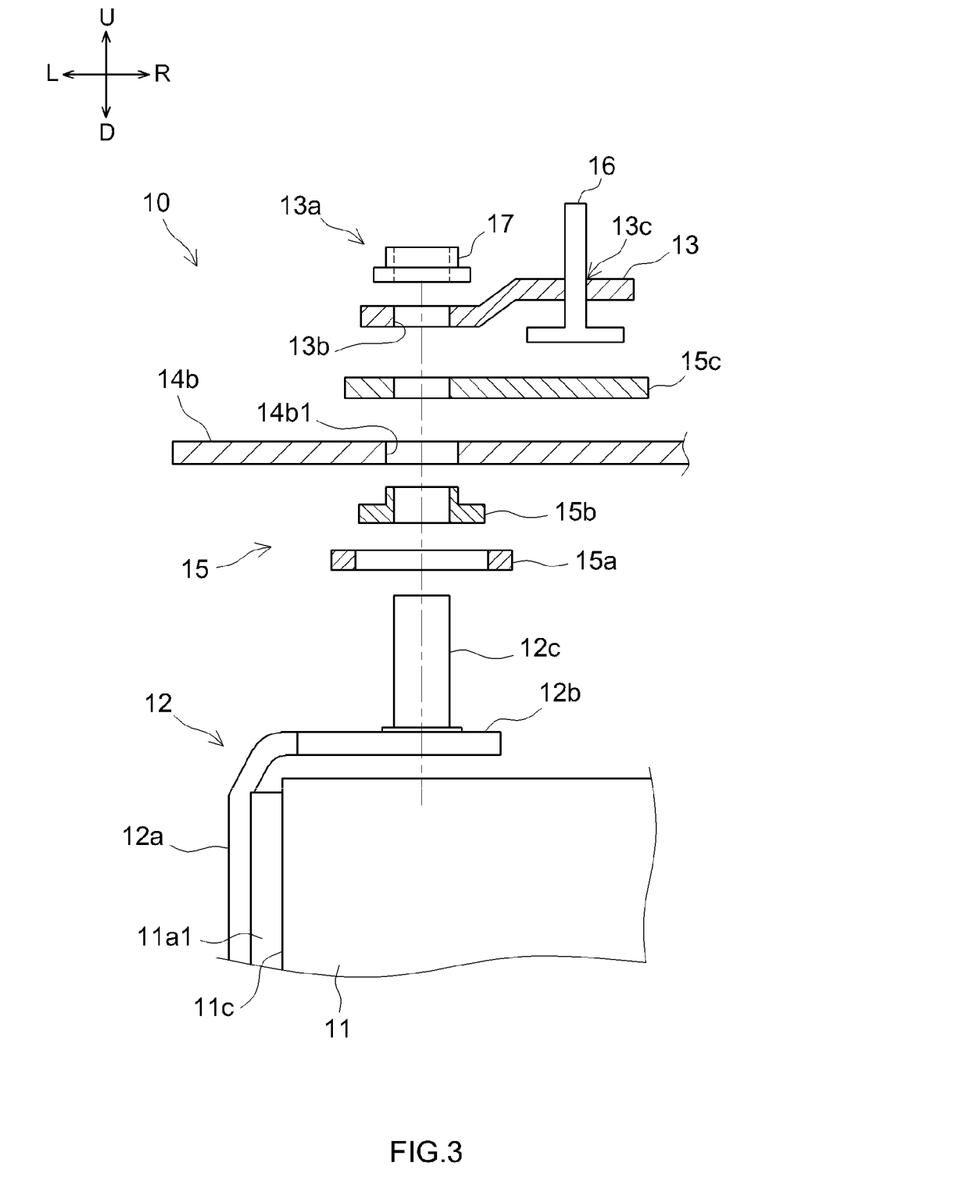
FIG. 3 is an exploded view of the battery 10, illustrating components of the battery 10, such as the internal terminal 12, the lid 14b of the battery case 14, and an external terminal 13.

FIG. 1 is a partial perspective view of the battery 10, with an electrode body 11 and an internal terminal 12 attached to a lid 14b of a battery case 14. In FIG. 1, the lid 14b of the battery case 14, to which the electrode body 11 and the internal terminal 12 are attached, is located away from an opening 14a1 of a case body 14a. FIG. 2 is a partial side view of the battery 10, with the internal terminal 12 attached to the lid 14b of the battery case 14. FIG. 3 is an exploded view of the battery 10, illustrating components of the battery 10, such as the internal terminal 12, the lid 14b of the battery case 14, and an external terminal 13.

As illustrated in FIG. 1, the battery 10 includes the electrode body 11, the internal terminal 12, the external terminal 13, the battery case 14, an insulator 15, and a bolt terminal 16.

As illustrated in FIG. 1, the battery case 14 includes the case body 14a and the lid 14b. The case body 14a includes a housing space in which the electrode body 11 is to be housed. The case body 14a is a rectangular exterior case that includes the opening 14a1 defined by the four surfaces of the case body 14a. The lid 14b is a rectangular lid to be fitted to the opening 14a1 of the battery case 14. As illustrated in FIG. 3, the lid 14b is provided with an attachment hole 14b1 through which the internal terminal 12 is to be attached to the lid 14b. In one example, the case body 14a and the lid 14b are each preferably made of aluminum or an aluminum alloy, such as 1000 series aluminum or 3000 series aluminum. The electrode body 11 is covered with an insulator, such as an insulating film (not illustrated). The electrode body 11 thus insulated is housed in the battery case 14.

A method for manufacturing the battery 10 includes the steps of:
 a) preparing the electrode body 11;
 b) preparing the internal terminal 12;
 c) attaching the internal terminal 12 to the electrode body 11;
 d) preparing the lid 14b that is a case component;
 e) preparing the external terminal 13; and
 f) attaching the internal terminal 12 to the lid 14b, with the internal terminal 12 attached to the electrode body 11.

Figure 4:
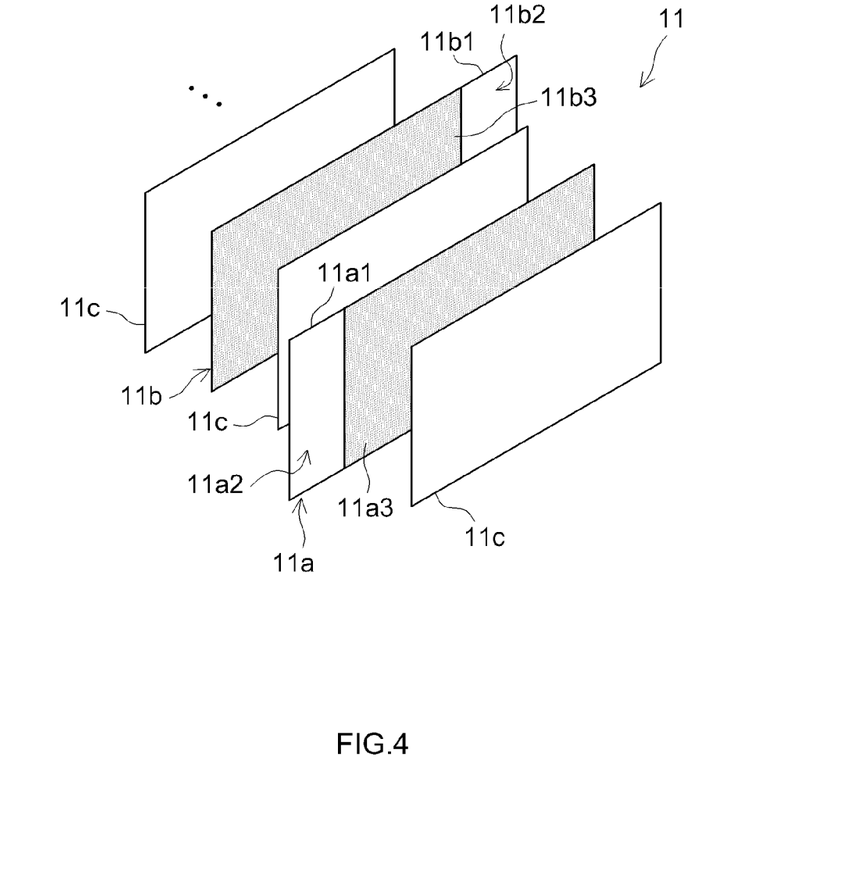
FIG. 4 is an exploded perspective view of the electrode body 11.

FIG. 4 is an exploded perspective view of the electrode body 11.

As illustrated in FIG. 4, the electrode body 11 prepared in step a) includes a plurality of positive electrode sheets 11a, a plurality of negative electrode sheets 11b, and a plurality of separators 11c. The positive electrode sheets 11a and the negative electrode sheets 11b are alternately stacked in a stacking direction, with each separator 11c interposed between associated adjacent ones of the positive electrode sheets 11a and the negative electrode sheets 11b. The positive electrode sheets 11a each include a collector foil 11a1. The negative electrode sheets 11b each include a collector foil 11b1.

In one example, each positive electrode sheet 11a includes: the collector foil 11a1 (which is aluminum foil in the present embodiment) having predetermined width and thickness; a positive electrode active material layer 11a3 containing a positive electrode active material; and a positive electrode active material layer-free portion 11a2 having a constant width. The positive electrode active material layer-free portion 11a2 is defined on an end of the collector foil 11a1 located on one side in the width direction of the collector foil 11a1. The positive electrode active material layer 11a3 is defined on both surfaces of the collector foil 11a1 except the positive electrode active material layer-free portion 11a2. For a lithium ion secondary battery, examples of the positive electrode active material include a lithium transition metal composite material that is capable of releasing lithium ions during charging and absorbing lithium ions during discharge. Examples of the positive electrode active material include various generally known materials in addition to such a lithium transition metal composite material. The positive electrode active material is thus not limited to any particular material.

In one example, each negative electrode sheet 11b includes: the collector foil 11b1 (which is copper foil in the present embodiment) having predetermined width and thickness; a negative electrode active material layer 11b3 containing a negative electrode active material; and a negative electrode active material layer-free portion 11b2 having a constant width. The negative electrode active material layer-free portion 11b2 is defined on an end of the collector foil 11b1 located on one side in the width direction of the collector foil 11b1. The negative electrode active material layer 11b3 is defined on both surfaces of the collector foil 11b1 except the negative electrode active material layer-free portion 11b2. For a lithium ion secondary battery, examples of the negative electrode active material include natural graphite that is capable of storing lithium ions during charging and releasing the lithium ions during discharge. Examples of the negative electrode active material include various generally known materials in addition to such natural graphite. The negative electrode active material is thus not limited to any particular material.

Examples of the separators 11c to be used include a porous resin sheet that has required heat resistance and allows an electrolyte to pass therethrough. Examples of the separators 11c include various other sheets. The separators 11c are thus not limited to any particular type of sheet.

In the present embodiment, a portion (or more specifically, the positive electrode active material layer-free portion 11a2) of the collector foil 11a1 of each positive electrode sheet 11a is protruded beyond a first widthwise end of each separator 11c. A portion (or more specifically, the negative electrode active material layer-free portion 11b2) of the collector foil 11b1 of each negative electrode sheet 11b is protruded beyond a second widthwise end of each separator 11c. The second widthwise end of each separator 11c is located opposite to the first widthwise end of each separator 11c. In the present embodiment, portions of the collector foils 11a1 of the positive electrode sheets 11a are protruded beyond the separators 11c in one direction, and portions of the collector foils 11b1 of the negative electrode sheets 11b are protruded beyond the separators 11c in the other direction. A structure to attach the internal terminal 12 to the collector foils 11a1 of the positive electrode sheets 11a may be different from a structure to attach the internal terminal 12 to the collector foils 11b1 of the negative electrode sheets 11b. Thus, either portions of the collector foils 11a1 of the positive electrode sheets 11a or portions of the collector foils 11b1 of the negative electrode sheets 11b, which have the structures described below, are preferably protruded beyond the separators 11c in one direction.

As illustrated in FIGS. 2 and 3, portions of the collector foils 11a1 of the battery 10 protruded beyond the separators 11c are piled in a stack in the stacking direct ion (i.e., in the thickness direction of the protruded portions of the collector foils 11a1). The stacking direction includes a first direction and a second direction opposite to the first direction.

FIGS. 2 and 3 illustrate a portion of the battery 10 where the internal terminal 12 is attached to the collector foils 11a1 of the positive electrode sheets 11a. The following description discusses a structure to attach the internal terminal 12 to the collector foils 11a1 of the positive electrode sheets 11a. In the present embodiment, another internal terminal 12 (i.e., a negative electrode internal terminal) is attached to the collector foils 11b1 of the negative electrode sheets 11b in a manner similar to that in which the internal terminal 12 (i.e., a positive electrode internal terminal) is attached to the collector foils 11a1 of the positive electrode sheets 11a.

FIG. 4 illustrates the electrode body 11 having a "stacked structure" in which the positive electrode sheets 11a and the negative electrode sheets 11b are alternately stacked, with each separator 11c interposed between associated adjacent ones of the positive electrode sheets 11a and the negative electrode sheets 11b. The electrode body 11 is not limited to the structure illustrated in FIG. 4. Although not illustrated, the electrode body 11 may be a "wound type" electrode body. The wound type electrode body includes a strip-shaped positive electrode sheet, a strip-shaped negative electrode sheet, and a strip-shaped separator. The positive electrode sheet and the negative electrode sheet are stacked, with the separator interposed between the positive electrode sheet and the negative electrode sheet. The positive electrode sheet, the negative electrode sheet, and the separator are wound into a flat shape. A portion (or more specifically, a positive electrode active material layer-free portion) of a collector foil of the positive electrode sheet is protruded beyond a first end of the separator located on one side along a winding axis. A portion (or more specifically, a negative electrode active material layer-free portion) of a collector foil of the negative electrode sheet is protruded beyond a second end of the separator located on the other side along the winding axis. The wound type electrode body wound into a flat shape has round corners. The protruded portions of the collector foils of the positive and negative electrode sheets, which define the round corners, may each be cut into pieces.

As illustrated in FIGS. 2 and 3, the internal terminal 12 prepared in step b) includes a connector 12a and a case coupling 12b. The connector 12a is attached to the collector foils 11a1. The case coupling 12b is attached to the lid 14b that is a case component. The case coupling 12b is provided with a shaft 12c.

The connector 12a of the internal terminal 12 preferably has a flat plate shape. The case coupling 12b is preferably a substantially rectangular plate. The case coupling 12b is preferably disposed on an end of the connector 12a. The shaft 12c is preferably inserted through the attachment hole 14b1 of the lid 14b.

Step c) involves attaching the internal terminal 12 to the electrode body 11. Step c) includes the sub-steps of:
  c1) piling the protruded portions of the collector foils 11a1 in a stack;
  c2) connecting the connector 12a of the internal terminal 12 to the stack of the protruded portions of the collector foils 11a1; and c3) bending the stack of the protruded portions of the collector foils 11a1 connected to the connector 12a.

The stack of the protruded portions of the collector foils 11a1 is bent around a base end of the protruded portions of the collector foils 11a1.

Figure 5:
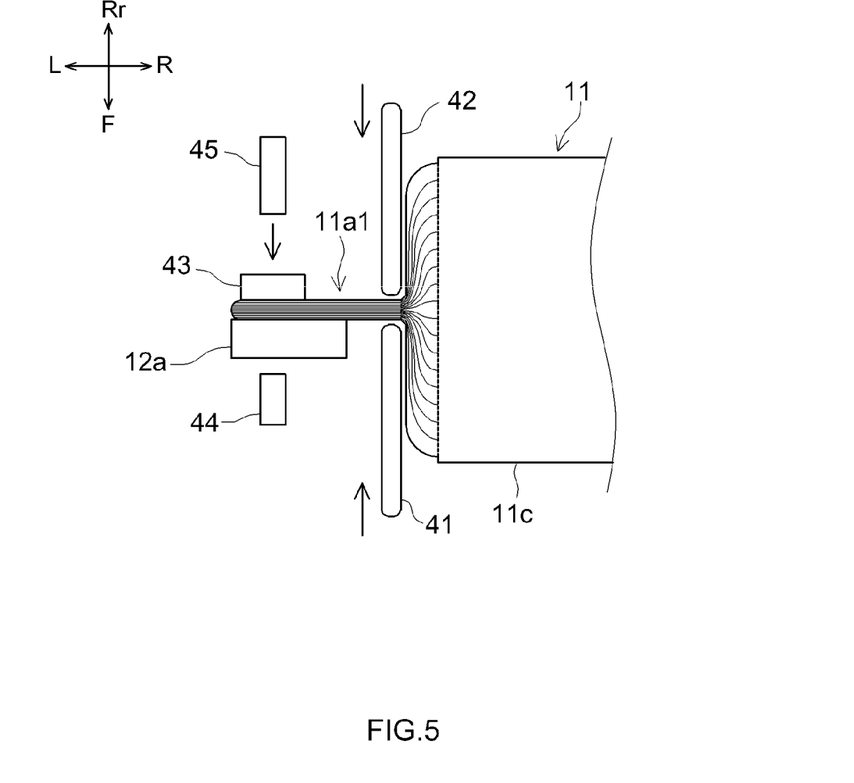
FIG. 5 is a plan view of the electrode body 11, illustrating sub-steps c1) and c2) of a battery manufacturing method according to an embodiment of the present disclosure.

FIG. 5 is a plan view of the electrode body 11, illustrating sub-steps c1) and c2) of the battery manufacturing method according to the present embodiment.

As illustrated in FIG. 5, sub-step c1) involves piling the protruded portions of the collector foils 11a1 in a stack in the stacking direction (see FIG. 4). In other words, the stacking direction (see FIG. 4) corresponds to the thickness direction of the protruded portions of the collector foils 11a1.

As illustrated in FIG. 5, sub-step c1) involves using a first plate 41 and a second plate 42 so as to pile the protruded portions of the collector foils 11a1 in a stack. Using the first plate 41 and the second plate 42, the protruded portions of the collector foils 11a1 are piled in a stack in the stacking direction.

The first plate 41 is brought into contact with the protruded portions of the collector foils 11a1 in the first direction so as to define the base end of the protruded portions of the collector foils 11a1.

The second plate 42 is brought into contact with the protruded portions of the collector foils 11a1 in the second direction so as to define the base end of the protruded portions of the collector foils 11a1.

The first plate 41 and the second plate 42 bring the protruded portions of the collector foils 11a1 to an intermediate location in the stacking direction so as to pile the protruded portions of the collector foils 11a1 in a stack The electrode body 11 is preferably disposed at a predetermined location. The first plate 41 is preferably brought into contact with the protruded portions of the collector foils 11a1 in the first direction such that the protruded portions of the collector foils 11a1 are brought to the intermediate location in the stacking direction so as to define the base end of the protruded portions of the collector foils 11a1. The second plate 42 is preferably brought into contact with the protruded portions of the collector foils 11a1 in the second direction such that the protruded portions of the collector foils 11a1 are brought to the intermediate location in the stacking direction so as to define the base end of the protruded portions of the collector foils 11a1. The protruded portions of the collector foils 11a1 are thus brought to the intermediate location and piled in a stack as illustrated in FIG. 5.

As illustrated in FIG. 5, sub-step c2) involves connecting the connector 12a of the internal terminal 12 to the stack of the protruded portions of the collector foils 11a1.

In the present embodiment, the protruded portions of the collector foils 11a1 are brought to the intermediate location in the stacking direction and piled in a stack using the first plate 41 and the second plate 42 as illustrated in FIG. 5. The connector 12a of the internal terminal 12 is connected to the protruded portions of the collector foils 11a1 brought to the intermediate location in the stacking direction. The connector 12a of the internal terminal 12 may be connected to the protruded portions of the collector foils 11a1 by resistance welding, ultrasonic welding, or laser welding, for example.

As illustrated in FIG. 5, the connector 12a of the internal terminal 12 is brought into contact with one side of the stack of the protruded port ions of the collector foils 11a1 located at the intermediate location in the stacking direction. A backup plate 43 is brought into contact with the other side of the stack of the protruded portions of the collector foils 11a1. A welding tip 44 is brought into contact with the connector 12a of the internal terminal 12 and a welding tip 45 is brought into contact with the backup plate 43, such that the connector 12a and the backup plate 43 are sandwiched between the welding tips 44 and 45. In this state, a current is passed through the welding tips 44 and 45. The connector 12a of the internal terminal 12, the stack of the protruded portions of the collector foils 11a1, and the backup plate 43 are thus resistance-welded to each other. The backup plate 43 may not be used if the connector 12a of the internal terminal 12 and the protruded portions of the collector foils 11a1 are adequately weldable to each other without the backup plate 43.

Figure 6:
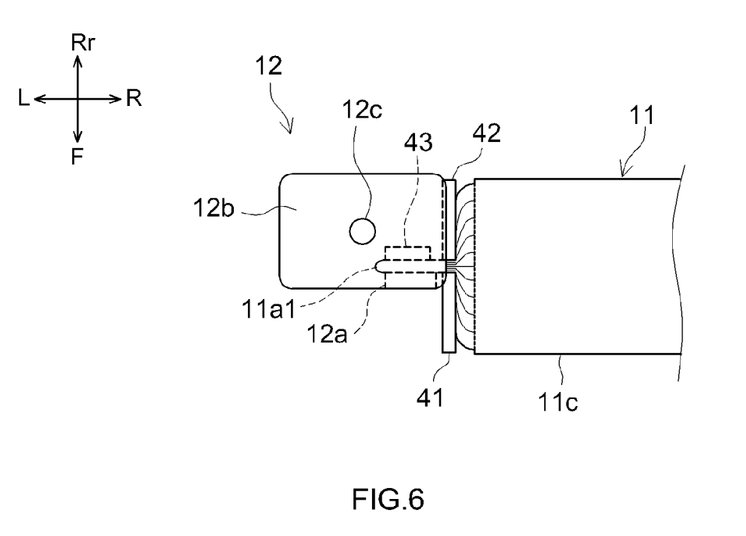
FIG. 6 is a plan view of the electrode body 11, with the internal terminal 12 attached to a stack of protruded portions of collector foils 11a in sub-step c2).
Figure 7:
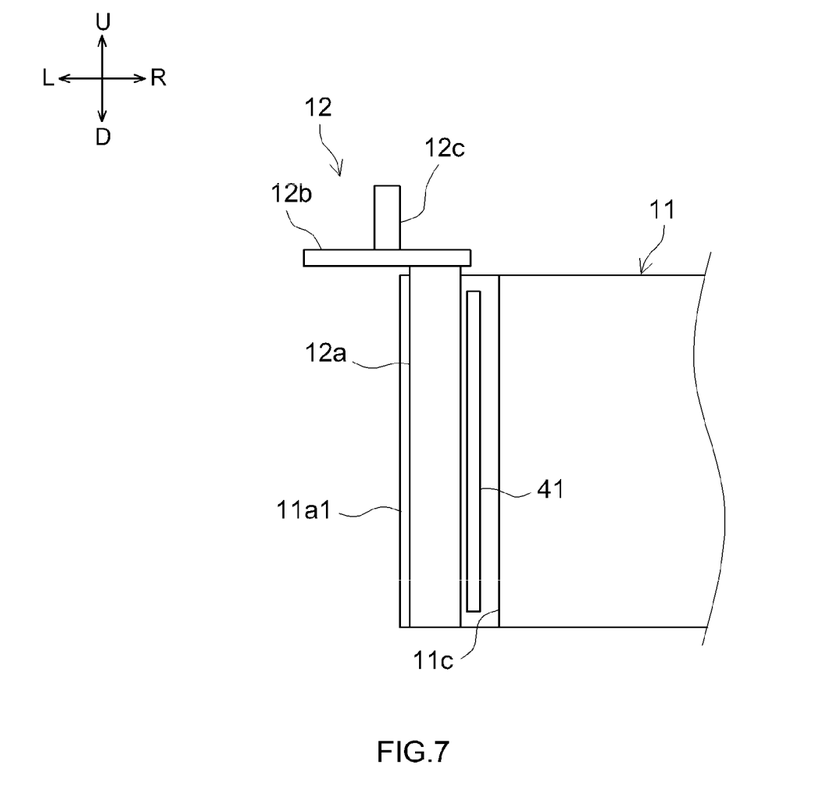
FIG. 7 is a side view of the electrode body 11, with the internal terminal 12 attached to the stack of the protruded portions of the collector foils 11a in sub-step c2).

FIG. 6 is a plan view of the electrode body 11, with the internal terminal 12 attached to the stack of the protruded portions of the collector foils 11a in sub-step c2). FIG. 7 is a side view of the electrode body 11, with the internal terminal 12 attached to the stack of the protruded portions of the collector foils 11a in sub-step c2).

Sub-step c3) involves bending the stack of the protruded portions of the collector foils 11a1 connected to the connector 12a. The stack of the protruded portions of the collector foils 11a1 is bent around the base end of the protruded portions of the collector foils 11a1.

Figure 8:
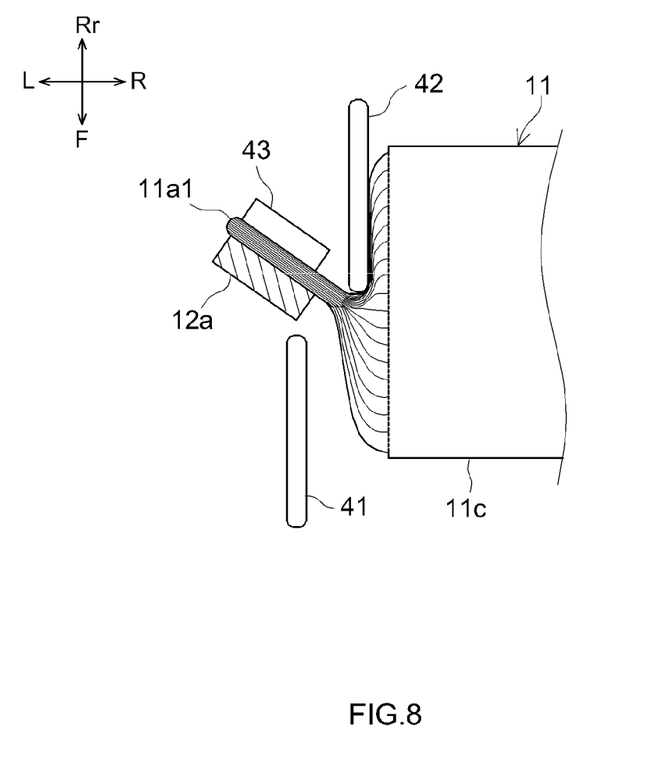

FIG. 8 is a plan view of the electrode body 11, illustrating sub-step c3) involving bending the stack of the protruded portions of the collector foils 11a1 connected to the connector 12a.

During or before the bending of the stack of the protruded portions of the collector foils 11a1 connected to the connector 12a, sub-step c3) involves removing one of the first and second plates 41 and 42 that is located opposite to a direction in which the stack of the protruded portions is to be bent.

In the example illustrated in FIG. 8, the stack of the protruded portions of the collector foils 11a1 connected to the connector 12a is bent such that the backup plate 43 approaches the second plate 42. This pulls the protruded portions of the collector foils 11a1 located adjacent to the connector 12a. In the example illustrated in FIG. 8, the first plate 41, which has been used to bring the protruded portions of the collector foils 11a1 to the intermediate location, is preferably removed with appropriate timing. The first plate 41 may be removed during or before the bending of the stack of the protruded portions of the collector foils 11a1 connected to the connector 12a.

Removal of the first plate 41 removes the pressure applied to the protruded portions of the collector foils 11a1 by the first plate 41. This makes it unlikely that the protruded portions of the collector foils 11a1 will be broken during sub-step c3). The backup plate 43 is preferably removed with appropriate timing during sub-step c3). Although not illustrated, the stack of the protruded portions of the collector foils 11a1 connected to the connector 12a may alternatively be bent in a direction in which the protruded portions of the collector foils 11a1 are connected to the connector 12a. In this case, the second plate 42, which has been used to bring the protruded portions of the collector foils 11a1 to the intermediate location, is preferably removed before removal of the first plate 41.

Figure 9:
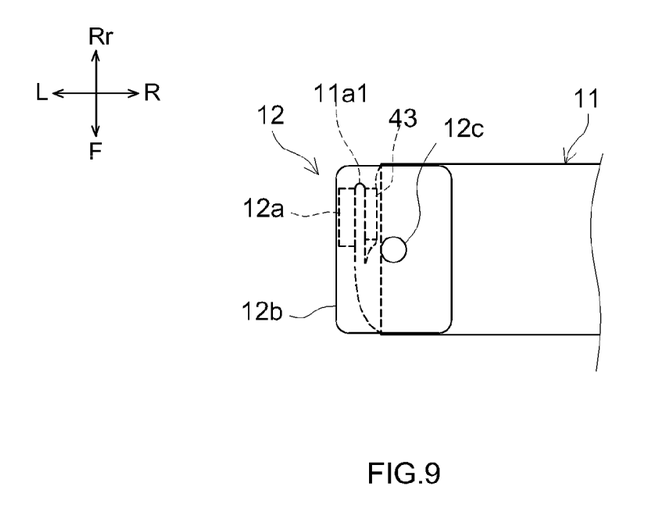
FIG. 9 is a plan view of the electrode body 11, with the stack of the protruded portions of the collector foils 11a bent in sub-step c3).
Figure 10:
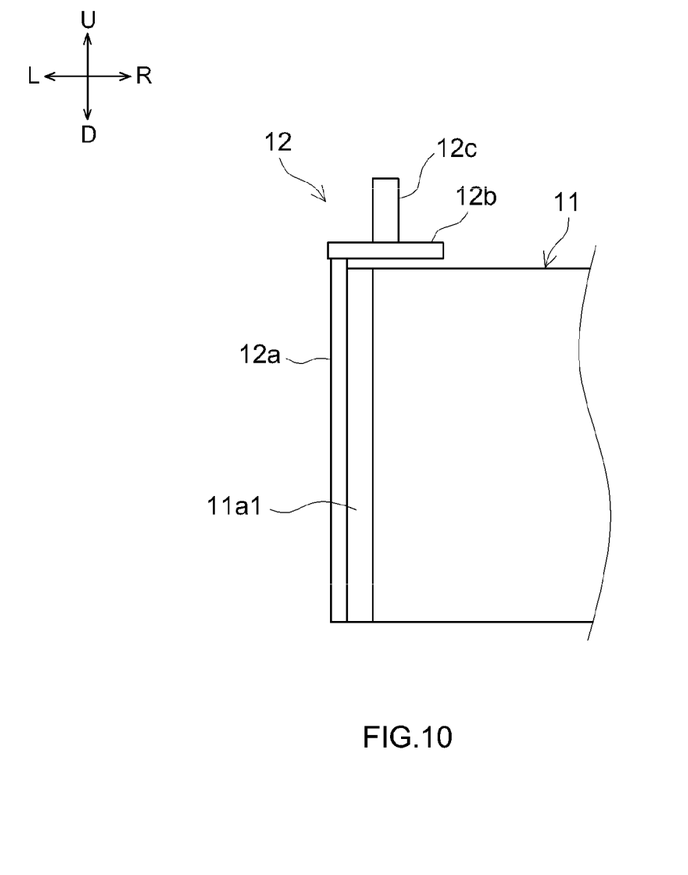
FIG. 10 is a side view of the electrode body 11, with the stack of the protruded portions of the collector foils 11a bent in sub-step c3).

FIG. 9 is a plan view of the electrode body 11, with the stack of the protruded portions of the collector foils 11a bent in sub-step c3). FIG. 10 is aside view of the electrode body 11, with the stack of the protruded portions of the collector foils 11a bent in sub-step c3).

As illustrated in FIG. 9, the connector 12a of the internal terminal 12 is disposed along the base end of the protruded portions of the collector foils 11a1. Thus, as illustrated in FIG. 10, the connector 12a of the internal terminal 12 is attached to the stack of the protruded portions of the collector foils 11a1 compactly in the direction of protrusion of the collector foils 11a1 from the electrode body 11 (i.e., in the width direction of the electrode body 11 in the present embodiment).

As illustrated in FIG. 9, the connector 12a of the internal terminal 12 is preferably designed such that the connector 12a does not protrude beyond the electrode body 11 in the stacking direction, with the stack of the protruded portions of the collector foils 11a1 bent around the base end of the protruded portions of the collector foils 11a1. As illustrated in FIG. 2, the case coupling 12b of the internal terminal 12 is preferably designed such that the case coupling 12b is located inward of the inner surface of the lid 14b.

As illustrated in FIGS. 6 and 7, the case coupling 12b may be oriented in any direction before the stack of the protruded portions of the collector foils 11a1 connected to the connector 12a is bent around the base end of the protruded portions of the collector foils 11a1, unless any particular limitation is imposed.

With the stack of the protruded portions of the collector foils 11a1 bent around the base end of the protruded portions of the collector foils 11a1, the connector 12a connected to the stack of the protruded portions is preferably located outward of the base end. The internal terminal 12 preferably includes the case coupling 12b to be attached to the lid 14b that is a case component. The case coupling 12b is preferably disposed on the end of the connector 12a that extends beyond the base end. The case coupling 12b preferably extends along the peripheral edge of the electrode body 11 from the end of the connector 12a.

In other words, the case coupling 12b of the internal terminal 12 preferably extends along the upper surface of the electrode body 11 (i.e., a surface of the electrode body 11 defined by the upper edges of the positive electrode sheets 11a and the negative electrode sheets 11b stacked) as illustrated in FIGS. 2, 3, and 10. This enables the components of the internal terminal 12 to be disposed along the peripheral edge of the electrode body 11, so that the internal terminal 12 is at least partially disposed in a gap between the electrode body 11 and the lid 14b of the battery case 14. Consequently, the present embodiment provides a compact collector structure for the electrode body 11.

Although the above description has discussed how the internal terminal 12 is attached to the collector foils 11a1 of the positive electrode sheets 11a, another internal terminal may similarly be attached to the collector foils 11b1 of the negative electrode sheets 11b (see FIG. 4).

The battery 10 preferably includes the positive electrode internal terminal 12 and a negative electrode internal terminal (not illustrated) similar in structure to the internal terminal 12. Portions of the collector foils 11b1 of the negative electrode sheets 11b (see FIG. 4) are preferably protruded beyond the second widthwise end of each separator 11c. The protruded portions of the collector foils 11b1 are preferably piled in a stack in the stacking direction. The connector 12a (see FIG. 6) of the negative electrode internal terminal is preferably connected to the stack of the protruded portions of the collector foils 11b1 of the negative electrode sheets 11b. The stack of the protruded portions of the collector foils 11b1 of the negative electrode sheets 11b (which is connected to the connector 12a of the negative electrode internal terminal) is preferably bent around a base end of the protruded portions of the collector foils 11b1 of the negative electrode sheets 11b (see FIG. 9). The connector 12a of the negative electrode internal terminal is attached to the stack of the protruded portions of the collector foils 11b1 of the negative electrode sheets 11b in a manner similar to that illustrated in FIG. 6. The stack of the protruded portions of the collector foils 11b1 of the negative electrode sheets 11b (which is attached to the connector 12a of the negative electrode internal terminal) is bent in a manner similar to that illustrated in FIG. 9.

As illustrated in FIG. 4, portions of the collector foils 11a1 of the positive electrode sheets 11a are protruded beyond the first widthwise end of each separator 11c, and portions of the collector foils 11b1 of the negative electrode sheets 11b are protruded beyond the second widthwise end of each separator 11c. The portions of the collector foils 11a1 of the positive electrode sheets 11a protruded beyond the first widthwise end of each separator 11c are piled in a stack in the thickness direction. The connector 12a of the positive electrode internal terminal 12 is connected to the stack of the protruded portions of the collector foils 11a1. The stack of the protruded portions of the collector foils 11a1 (which is connected to the connector 12a of the positive electrode internal terminal 12) is bent around the base end of the protruded portions of the collector foils 11a1. The portions of the collector foils 11b1 of the negative electrode sheets 11b protruded beyond the second widthwise end of each separator 11c are piled in a stack in the thickness direction. The connector 12a of the negative electrode internal terminal is connected to the stack of the protruded portions of the collector foils 11b1. The stack of the protruded portions of the collector foils 11b1 (which is connected to the connector 12a of the negative electrode internal terminal) is bent around the base end of the protruded portions of the collector foils 11b1. Consequently, the present embodiment provides a compact positive electrode collector structure adjacent to the first widthwise ends of the separators 11c of the electrode body 11 and a compact negative electrode collector structure adjacent to the second widthwise ends of the separators 11c of the electrode body 11.

The connector 12a of the positive electrode internal terminal 12 is connected to the stack of the portions of the collector foils 11a1 of the positive electrode sheets 11a protruded beyond the first widthwise ends of the separators 11c, and the stack of the protruded portions of the collector foils 11a1 (which is connected to the connector 12a of the positive electrode internal terminal 12) is bent around the base end of the protruded portions of the collector foils 11a1 (see FIGS. 9 and 10). Although not illustrated, the connector 12a of the negative electrode internal terminal is connected to the stack of the portions of the collector foils 11b1 of the negative electrode sheets 11b (see FIG. 4) protruded beyond the second widthwise ends of the separators 11c, and the stack of the protruded portions of the collector foils 11b1 (which is connected to the connector 12a of the negative electrode internal terminal) is bent in a manner similar to that illustrated in FIGS. 9 and 10. This reduces the gap between the positive electrode active material layer 11a3 of each positive electrode sheet 11a and the negative electrode active material layer 11b3 of the adjacent negative electrode sheet 11b (see FIG. 4) on both sides in the width direction of the associated separator 11c. Thus, a capillary phenomenon makes it likely that an electrolyte will be held between each positive electrode sheet 11a and the adjacent negative electrode sheet 11b on both sides in the width direction of the associated separator 11c. Consequently, "drying up" of an electrolyte is unlikely to occur on both sides in the width direction of each separator 11c.

As illustrated in FIGS. 9 and 10, the stack of the protruded portions of the collector foils 11a1 (which is connected to the connector 12a of the internal terminal 12) is bent around the base end of the protruded portions of the collector foils 11a1. In this state, the case coupling 12b of the internal terminal 12 is attached to the lid 14b that is a case component (see FIG. 3).

Step d) involves preparing the lid 14b that is a case component. The lid 14b is preferably provided with the attachment hole 14b1 through which the shaft 12c extending from the case coupling 12b of the internal terminal 12 is to be inserted.

Step e) involves preparing the external terminal 13. The external terminal 13 preferably includes a connector 13a to be connected with an end of the shaft 12c of the internal terminal 12 inserted through the attachment hole 14b1 of the lid 14b.

Step f) involves attaching the internal terminal 12 to the lid 14b, with the internal terminal 12 attached to the electrode body 11 in step c).

In one example, step f) involves inserting the shaft 12c of the internal terminal 12 through the attachment hole 14b1 of the lid 14b, with the insulator 15 disposed in the attachment hole 14b1. Step f) then preferably involves connecting the connector 13a of the external terminal 13 to the shaft 12c of the internal terminal 12 inserted through the attachment hole 14b1.

In the present embodiment, the shaft 12c of the internal terminal 12 attached to the electrode body 11 is inserted through the attachment hole 14b1 of the lid 14b as illustrated in FIGS. 2 and 3. The shaft 12c is inserted through the attachment hole 14b1 from inside the lid 14b, with gaskets 15a and 15b interposed between the lid 14b and the case coupling 12b of the internal terminal 12. The gaskets 15a and 15b are components of the insulator 15.

At a location outside the lid 14b, an insulating member 15c is fitted to the shaft 12c of the internal terminal 12 attached to the lid 14b. The insulating member 15c is a component of the insulator 15. The external terminal 13 is provided with: an insertion hole 13b through which the shaft 12c of the internal terminal 12 is to be inserted; and an insertion hole 13c through which the bolt terminal 16 is to be inserted. The present embodiment involves inserting the shaft 12c of the internal terminal 12 through the insertion hole 13b and inserting the bolt terminal 16 through the insertion hole 13c so as to attach the bolt terminal 16 and the external terminal 13 onto the insulating member 15c as illustrated in FIG. 2.

As illustrated in FIG. 3, the connector 13a includes a swaging member 17. As illustrated in FIG. 2, the swaging member 17 is attached to the end of the shaft 12c of the internal terminal 12 inserted through the insertion hole 13b of the external terminal 13. This prevents the external terminal 13 fitted to the shaft 12c of the internal terminal 12 from being disengaged from the shaft 12c of the internal terminal 12. The external terminal 13 is preferably at least partially welded to the shaft 12c of the internal terminal 12 so as to provide conductivity between the internal terminal 12 and the external terminal 13.

The connector 13a that connects the external terminal 13 to the shaft 12c of the internal terminal 12 is not limited to the above-described structure. Alternatively, the external terminal 13 may be provided with a boss through which the shaft 12c of the internal terminal 12 is to be inserted, and the boss may be radially swaged by electromagnetic welding. The shaft 12c of the internal terminal 12 may thus be secured and connected to the boss of the external terminal 13.

As described above, the positive electrode internal terminal 12 and the negative electrode internal terminal, which are attached to the electrode body 11, are further attached to the lid 14b. This attaches the electrode body 11 to the lid 14b. In this state, the electrode body 11 is preferably housed in the case body 14a such that the opening 14a1 of the case body 14a is covered with the lid 14b. The peripheral edge of the lid 14b is then preferably welded to the opening 14a1 of the case body 14a.

Various embodiments of the present disclosure have been described thus far. Unless otherwise specified, the embodiments of the present disclosure described herein do not limit the present invention.

In the above-described embodiment, the collector foils 11a1 of the positive electrode sheets 11a are similar in collector structure to the collector foils 11b1 of the negative electrode sheets 11b. Alternatively, the collector foils 11a1 of the positive electrode sheets 11a may be different in collector structure from the collector foils 11b1 of the negative electrode sheets 11b. In such a case, at least either portions of the collector foils 11a1 of the positive electrode sheets 11a or portions of the collector foils 11b1 of the negative electrode sheets 11b are preferably protruded beyond the separators 11c in one direction, and the protruded portions are preferably piled in a stack in the stacking direction. At least either the positive electrode internal terminal 12 or the negative electrode internal terminal preferably includes the connector 12a to be connected to the stack of the protruded portions. The stack of the protruded portions connected to the connector 12a is preferably bent around the base end of the protruded portions. Thus, at least either the collector foils 11a1 of the positive electrode sheets 11a or the collector foils 11b1 of the negative electrode sheets 11b may have the collector structure described above.

The shapes of the components of the battery 10, such as the internal terminal 12, the external terminal 13, and the insulator 15, are not limited to the shapes illustrated in the drawings. Various changes may be made to the shapes of the components of the battery 10. Although the internal terminal 12 is attached to the lid 14b that is a case component, the internal terminal 12 may alternatively be attached to the case body 14a that is another case component.

What is claimed is:

1. A battery comprising:

an electrode body; and an internal terminal attached to the electrode body, wherein the electrode body includes a plurality of positive electrode sheets, a plurality of negative electrode sheets, and a plurality of separators, the plurality of positive electrode sheets and the plurality of negative electrode sheets are alternately stacked in a stacking direction, with a separator of the plurality of separators interposed between associated adjacent ones of the positive electrode sheets and the negative electrode sheets of the respective plurality of the positive electrode sheets and the plurality of the negative electrode sheets, the plurality of positive electrode sheets and the plurality of negative electrode sheets each including a collector foil, at least a portion of each of the collector foils of the plurality of positive electrode sheets protrude beyond first widthwise ends of the plurality of separators, and at least a portion of each of the collector foils of the plurality of negative electrode sheets protrude beyond second widthwise ends of the plurality of separators, the second widthwise ends of the plurality of separators being opposite to the first widthwise ends of the plurality of separators in a widthwise direction which is perpendicular to the stacking direction, the protruded portions of the respective collector foils are piled in a stack in the stacking direction, the internal terminal includes a connecter connected to the stack of the protruded portions of the respective collector foils, and the stack of the protruded portions of the respective collector foils connected to the connecter is bent at a base end thereof in a direction parallel to the stacking direction, wherein the battery includes a case, the internal terminal includes a positive electrode internal terminal and a negative electrode internal terminal, each of the positive electrode internal terminal and the negative electrode internal terminal includes a case coupling attached to a component of the case and a shaft, the connecter of the internal terminal includes a positive connector and a negative connector, the case couplings of the respective positive and negative electrode internal terminals are disposed on an end of the respective positive and negative connecters such that the respective case couplings extend along peripheral edges of the electrode body at respective first and second widthwise ends of the case, the shaft of the internal terminal is inserted through an attachment hole of a lid of the case, the connector of the internal terminal has a flat plate shape, and with the stack of the protruded portions of the respective collector foils bent at the base end of the protruded portions of the respective collector foils, the connector connected to the stack of the protruded portions of the respective collector foils is located outside of the base end of the protruded portions of the respective collector foils.

2. The battery according to claim 1, wherein the positive electrode internal terminal includes the positive connector, the positive connector of the positive electrode internal terminal is connected to the collector foils of the plurality of positive electrode sheets of the stack of the protruded portions of the respective collector foils, the collector foils of the plurality of positive electrode sheets of the stack of the protruded portions of the respective collector foils connected to the positive connector are bent at a base end of the collector foils of the plurality of positive electrode sheets of the stack of the protruded portions of the respective collector foils, the negative electrode internal terminal includes the negative connector, the negative connector of the negative electrode internal terminal is connected to collector foils of the plurality of negative electrode sheets of the stack of the protruded portions of the respective collector foils, and the collector foils of the plurality of negative electrode sheets of the stack of the protruded portions of the respective collector foils connected to the negative electrode connector are bent at a base end of the collector foils of the plurality of negative electrode sheets of the stack of the protruded portions of the respective collector foils.

* * * * *